United States Patent

[11] 3,617,193

| [72] | Inventors | Giuliana C. Tesoro<br>Dobbs Ferry, N.Y.;<br>Donald R. Moore, Rutherford; Wing-Kai<br>Lee, Hackensack, N.J. |
|---|---|---|
| [21] | Appl. No. | 667,070 |
| [22] | Filed | Sept. 12, 1967 |
| [45] | Patented | Nov. 2, 1971 |
| [73] | Assignee | J. P. Stevens & Co., Inc.<br>New York, N.Y. |

[54] FLAME-RETARDANT BIS(EPOXYALKYL) METHYLPHOSPHONATE TREATED SUBSTRATE AND PROCESS THEREFOR
17 Claims, No Drawings

[52] U.S. Cl. .................................................. 8/116.2,
8/116.3, 8/120, 8/129, 252/8.1, 117/136, 117/137,
106/15, 260/348, 260/231
[51] Int. Cl. ................................................... D06m 13/28,
D06m 13/38, C09k 3/28
[50] Field of Search ............................................ 117/137,
136; 260/231, 348; 8/116.2, 120, 116.3, 116–120
P, DIG. 8; 252/8.1; 106/15 FP

[56] References Cited
UNITED STATES PATENTS

| 2,856,369 | 10/1958 | Smith | 260/348 X |
|---|---|---|---|
| 3,213,057 | 10/1965 | Ritt | 260/348 X |
| 3,281,502 | 10/1966 | Pelletier et al. | 260/348 X |
| 3,306,937 | 2/1967 | Clampitt et al. | 252/8.1 X |
| 3,325,563 | 6/1967 | Taylor et al. | 252/8.1 X |
| 3,403,049 | 9/1968 | Carpenter et al. | 117/136 |
| 3,412,052 | 11/1968 | Taylor et al. | 252/8.1 X |
| 3,421,834 | 6/1969 | Grayson | 117/137 |
| 3,428,480 | 2/1969 | Wagner et al. | 117/137 |
| 3,429,733 | 2/1969 | Wolf et al. | 117/136 X |
| 3,484,184 | 12/1969 | Chance et al. | 8/120 |
| 3,488,139 | 1/1970 | Vullo | 8/120 |
| 3,505,003 | 4/1970 | Vullo | 8/120 |
| 3,515,578 | 6/1970 | Tomita et al. | 117/137 X |
| 3,516,853 | 6/1970 | Tesoro et al. | 117/137 |
| 3,528,998 | 9/1970 | Tesoro | 260/348 |
| 2,781,281 | 2/1957 | Berger | 8/116.3 |
| 2,809,941 | 10/1957 | Reeves et al. | 8/120 |
| 2,810,701 | 10/1957 | Reeves et al. | 8/116.2 |
| 2,814,573 | 11/1957 | Reeves et al. | 8/116.2 |
| 2,991,146 | 7/1961 | Babiary | 8/120 |
| 3,054,698 | 9/1962 | Wagner | 8/116.2 |

OTHER REFERENCES

Nuessle et al., Textile Research Journal, Vol. 26, pp. 32–39 (1956).

*Primary Examiner*—George F. Lesmes
*Assistant Examiner*—J. Cannon
*Attorneys*—J. Bradley Cohn and Kenyon & Kenyon

ABSTRACT: A flammable substrate, especially a cellulosic substrate such as cotton, is rendered flame-retardant by treatment with (1) a bis(epoxyalkyl) methylphosphonate such as bis(2,3-epoxypropyl) methylphosphonate or bis(2,3-epoxypropyl) chloromethylphosphonate, and (2) an organic nitrogen-containing compound, such as urea or $N^2, N^4, N^6$-tris(hydroxymethyl)melamine. A treatment which is resistant to laundering is obtained when at least the phosphonate is insolubilized by polymerization on the surface of the substrate and/or reaction with the substrate. When a halomethylphosphonate is employed, the phosphorus content of the treated substrate can be increased by further treatment with a tris(haloalkyl) phosphite and/or a trialkyl phosphite.

FLAME-RETARDANT BIS(EPOXYALKYL) METHYLPHOSPHONATE TREATED SUBSTRATE AND PROCESS THEREFOR

DESCRIPTION OF THE INVENTION

Having briefly summarized the disclosure, the present invention is concerned with imparting flame-retardant properties to a flammable substrate by treatment with a bis(epoxyalkyl) methylphosphonate and an organic nitrogen compound. In a preferred embodiment this invention is concerned with a bis(epoxyalkyl) methylphosphonate-modified cellulose which has also been treated with an organo-nitrogen compound to impart improved flame-retardant properties thereto.

It has long been known that flame-retardant properties may be imparted to flammable substrates, for example cellulose, particularly in a textile form, by treatment with phosphoric acid or compounds capable of forming phosphoric acid or its anhydride on burning. However, these methods are generally unacceptable, especially for textile applications, due to serious degradation of the cellulose as well as lack of durability of the treatment.

More recently treatments employing organophosphorus compounds have been developed in an effort provide flame retardance without concurrent damage to the cellulose and to render the phosphorus-containing agent resistant to removal during laundering. Although many of these treatments are in commercial use today, none has been completely successful due to the high cost of the organophosphorous compound and the high degree of add-on of organophosphorous compound required to provide flame-retardant properties. In addition many of the previously employed treatments cannot be applied with conventional apparatus. Finally, few of these treatments are durable to laundering.

It has been discovered by this invention that certain bis(epoxyalkyl) methylphosphonates are of utility as flame-retardant agents. These compounds are generally represented by the formula:

$$(RO)_2P(O)CH_2R^1 \quad (I)$$

wherein R is epoxy lower alkyl; and $R^1$ is hydrogen, halogen or $O,O^1$-di(lower alkyl) phosphono $[-P(O)(OR^2)_2$ wherein $R^2$ is lower alkyl].

By the term "epoxy lower alkyl" is meant an epoxyalkyl group of from about three to six carbons, whether branched or straight chain, whose valence bond is from a carbon other than one forming the oxirane ring

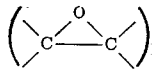

Preferred are epoxyalkyl groups having a terminal epoxy group, with the 2,3-epoxypropyl group being particularly preferred.

By the term "halogen" is meant an element of Group VII-A of the Periodic Table having an atomic number of from 17 to 53, inclusive, i.e., chlorine, bromine and iodine, with chlorine being preferred.

By the term "lower alkyl" is meant a linear or branched chain alkyl group of up to about six carbons, such as methyl, ethyl, propyl, isopropyl, butyl, tert-butyl, hexyl and the like.

The bis(epoxyalkyl) methylphosphonates of Formula I are of interest because of their high phosphorus content, their ability to polymerize or react with an active hydrogen-containing substrate to form an insoluble, phosphorus-containing treatment and because of the resistance of the resulting treatment to hydrolytic attack under the conditions normally encountered during laundering. In addition, these compounds are easily synthesized from readily available starting materials.

These compounds, when employed alone, are not highly efficient flame-retardant agents. For example, most presently employed phosphorus-containing flame-retardant agents impart a satisfactory degree of flame retardance to 8-ounce cotton fabrics at a phosphorus add-on of about 2 to 2.5 percent. The bis(epoxyalkyl) methylphosphonates of Formula I, however, provide satisfactory flame-retardant properties at somewhat higher phosphorus content. As a result, the total add-on required to achieve flame-retardant properties is too high for some purposes, for example for treating textiles where fabric properties such as hand are adversely affected by a high add-on of organic additives.

It has been further discovered, however, that, when the substrate is treated both with a bis(epoxyalkyl) methylphosphonate of Formula I and an organic nitrogen-containing compound, a highly satisfactory degree of flame retardance is obtained at surprisingly low levels of combined nitrogen and phosphorus.

The compounds of Formula I are either known compounds or can be synthesized from known compounds. For example, phosphonate esters wherein $R^1$ is hydrogen or halogen are obtained by reacting an epoxy alcohol with a methylphosphonic dihalide as is illustrated by the reaction of glycidol with methylphosphonic dichloride.

EQUATION A

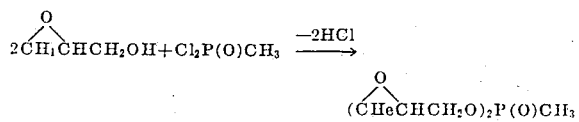

This reaction is desirably conducted in an inert organic solvent such as toluene in the presence of an acid acceptor, such as triethylamine or pyridine, at room temperature or below.

Dialkyl bis(epoxyalkyl) methylenediphosphonates within the scope of Formula I can be synthesized from bis(epoxyalkyl) halomethylphosphonates produced according to Equation A by reaction of the halomethylphosphonate with a trialkyl phosphite. This reaction is illustrated by the reaction of bis(2,3-epoxy-propyl) chloromethylphosphonate with triethyl phosphite:

EQUATION B

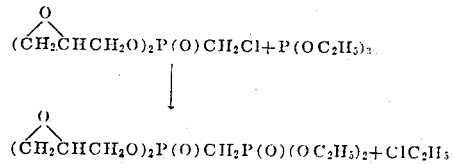

It has been found, however, that good yields of methylenediphosphonates are not easily obtained. Accordingly, compounds wherein $R^1$ is hydrogen or halogen are preferred.

Illustrative compounds coming within the scope of Formula I include:

bis(2,3-epoxypropyl) methylphosphonate,
bis(2,3-epoxybutyl) methylphosphonate,
bis(3,4-epoxybutyl) methylphosphonate,
bis(2,3-epoxypropyl) chloromethylphosphonate,
bis(2,3-epoxypropyl) bromomethylphosphonate,
bis(2,3-epoxypropyl) dimethyl methylenediphosphonate,
bis(2,3-epoxypropyl) diethyl methylenediphosphonate
bis(2,3-epoxypropyl) diisopropyl methylenediphosphonate,
di-sec-butyl bis(2,3-epoxypropyl) methylenediphosphonate,
bis(1,2-dimethylpropyl) bis(2,3-epoxypropyl) methylenediphosphonate, and
bis(2,3-epoxypropyl) dineopentyl methylenediphosphonate.

The nitrogen compounds which can be employed in accordance with this invention include organic compounds having a carbon-nitrogen linkage, with compounds wherein nitrogen is in the form of an amine or an amide group being preferred. Amide forms include the carboxamide (-CON<) and sulfonamide (-SO$_2$N<) forms, with the carboxamide form being preferred. It is essential, however, that the nitrogen compound have a low volatility, e.g., a normal boiling point higher than about 200° C., at least in the form in which it is present on the substrate, to ensure its presence throughout the useful life of the treated product.

Particularly preferred nitrogen-containing compounds are those containing the linkage represented by the partial formula:

 (II)

Wherein Z is oxo, thioxo, or substituted or unsubstituted imino; i.e., compounds containing the ureylene, thioureylene or guanidinylene linkages.

The free valences of the above linkage may be bonded to hydrogen, carbon or nitrogen. Preferred acyclic compounds containing this linkage may be represented by the general formula:

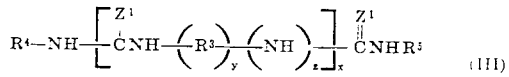 (III)

Wherein each $Z^1$, when taken separately, is oxo, thioxo or imino; $R^3$ is a divalent hydrocarbylene, especially alkylene, radical of one to five carbons; $R^4$ and $R^5$ each are hydrogen, cyano, amino, or hydrocarbyl or hydroxyhydrocarbyl, especially alkyl or hydroxyalkyl, of up to five carbons; each of y and z has a value of 0 or 1; and x is an integer having a value of at least 0 and preferably of 0 or 1.

Illustrative compounds include urea, thiourea, guanidine, dicyandiamide, biguanide, semicarbizide, carbohydrazide, biurea, 1,1'-ethylenediurea, N,N'-dimethylolurea and the like.

Another class of nitrogen compounds are those heterocyclic compounds of the formula:

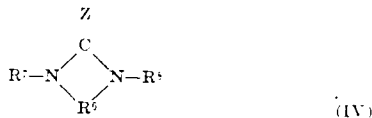 (IV)

Wherein Z is as defined above; $R^6$ is a divalent hydrocarbyl group, preferably alkylene, of up to six carbons, which, when taken with the NC(Z)N grouping, forms a 5- to 6- membered heterocyclic ring; and each $R^7$ and $R^8$ is hydrogen, lower hydrocarbyl, or lower hydroxyhydrocarbyl (e.g., lower alkyl or hydroxy lower alkyl of up to six carbons).

Illustrative examples include 2-imidazolidinone, 2-imidazolidinethione, 2-iminoimidazolidine, N,N'-diethyl-2-imidazolidinone, N,N'-dimethylol-2-imidazolidinone and the like.

Still another class of useful nitrogen-containing heterocyclic compounds are s-triazine derivatives of the formula:

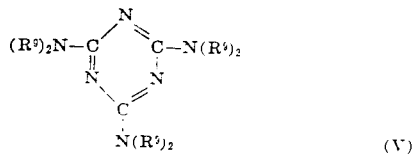 (V)

Wherein each $R^9$, independently, is hydrogen, lower hydrocarbyl or hydroxy or alkoxy lower hydrocarbyl, (e.g., lower alkyl, hydroxy lower alkyl or lower alkoxy lower alkyl).

Illustrative compounds include melamine, $N^2, N^4, N^6$-trimethylemelamine, $N^2, N^4, N^6$-tris(hydroxymethyl)melamine, hexakis-(methoxymethyl)melamine and the like.

In addition to these compounds, polyalkylenamines, preferably containing at least four nitrogen atoms per molecule, wherein the alkylene group has from two to about six carbons, are highly desirable nitrogen compounds.

The method by which the substrate is treated with the methylphosphonate and organic nitrogen compound is not critical, and in general suitable techniques will be apparent to those of ordinary skill in the art. For example, the phosphonate and nitrogen compound can be applied separately in any order, or they can be applied simultaneously. The agents are normally applied as a solution in a suitable inert solvent by any convenient technique, such as padding, spraying, immersion and the like. For textile applications, it is generally preferred to pad the textile form with an aqueous solution of the phosphonate and the nitrogen compound.

The concentration of the phosphonate and nitrogen compound in the solution is not critical, and, as is known in the art, will vary depending upon the desired degree of add-on of organic agent and wet pickup. Although water is the preferred solvent, inert organic solvents can be employed if desired. In addition to the solvent, the epoxy phosphonate and/or the organic nitrogen-containing compound, the solution may contain catalysts to aid in insolubilizing the flame-retardant agents, as well as other additives to modify substrate properties. For example, if employed in textile applications the solution may contain fabric softeners, antistatic agents, optical whiteners and the like.

After application to the substrate, the phosphonate and nitrogen-containing compounds are desirably insolubilized to render them resistant to removal during laundering. Specific nitrogen-containing compounds can be insolubilized by any technique known to the art, as by reaction with the substrate. For example, oxymethyl s-triazines of Formula V are insolubilized by treatment with steam in an aqueous medium in the presence of hydrogen peroxide as a catalyst or by baking in the presence of an acid-forming catalyst.

The phosphonates of Formula I are readily insolubilized by heating at elevated temperatures, for example from about 120° C. to about 180° C., preferably in the presence of an acidic catalyst such as zinc fluoborate, zinc nitrate, zinc chloride, ammonium chloride, magnesium chloride, magnesium nitrate and the like.

When the substrate is chemically inert toward the phosphonate, insolubilization is effected by polymerization of the phosphonate through the epoxyalkyl groups. The polymerization can be either a homopolymerization or a copolymerization with another polyepoxide or with a polyfunctional organic compound having active hydrogen which will react with epoxides. Suitable active hydrogen-containing compounds include alcohols, amines, amides, carboxylic acids and the like. When the comonomer increases total add-on without contributing toward the flame-retardant treatment, copolymerization is not preferred. However, copolymerization with amines or amides, especially those of low vapor pressure, is a desirable method of simultaneously incorporating nitrogen in an insoluble form and insolubilizing the phosphonate. Generally, copolymerization is effected within 5 minutes at 120°±20° C.

When the substrate is a polyfunctional, active-hydrogen-containing substrate such as cellulose, the phosphonate of Formula I can be insolubilized by reaction with the substrate. In this instance, the phosphonate, in addition to its flame-retardant effect, will cross-link the substrate. Thus when cellulose in a textile form is treated in accordance with this invention the resulting product also has improved wash-wear properties.

The amounts of phosphorus and nitrogen which are applied to the substrate are not narrowly critical to this invention, provided that they are at least sufficient to impart the desired degree of flame retardance. The specific amounts necessary for this purpose will depend upon the substrate and the standard of flame retardance employed.

For example, the substrate greatly influences the degree of flame retardance both on a molecular level and on a macroscopic level. Thus certain molecular forms of cellulose, for example, rayon, are more flammable than other forms, such as cotton. Similarly, certain physical forms, for example fibers or yarns, are more flammable than others, such as fabrics woven from the same fibers or yarns. Again, the density or surface area per unit weight affects flammability, with lightweight fabrics (e.g. 4 ounces per square yard) being more flammable than heavier (e.g., 8-ounce) fabrics woven from the same thread or yarn. In addition, because burning is essentially a surface phenomenon, a thick article, for example a piece of wood, can be rendered flame-retardant with less additive, on a weight per weight basis, than a thin article.

Similarly, the required amount of phosphorus (and nitrogen) will depend upon the particular standard of flame retardance employed. In this regard, it should be noted that no universal test has been devised to determine flame retardance. Indeed, there is no generally-accepted definition of the term. In most cases the article to be evaluated is tested under actual or simulated conditions of intended use, and the standard of flame retardance is related only to that use. As a result, the correlation of the degree of flame retardance obtained by a given flame-retardant agent on one cellulosic form with that obtained on a different cellulosic form based upon the teachings of the prior art is difficult, if not impossible.

As employed in this application, however, the term "flame retarding" is synonymous with "self-extinguishing." That is, flame-retardant properties obtain when, although the surface or article may burn when in direct contact with a flame source, the flame will go out once the source is removed rather than continue to propagate. One commonly employed test for determining flame retardance, as employed in this sense, is the so-called vertical flame test, which is generally applicable only to planar cellulose forms, for example cellulosic fabrics, whether bonded, knitted or woven, paper sheets and the like. In this test a fixed flame source is applied to the bottom edge of a vertically held strip of the material for a given period of time and then removed. The length of the charred or burned portion, i.e., the "char length," of the sample is measured, and is the index of flame-retardant properties. On the other hand, the flame-retardant properties of wood treated to reduce flammability are frequently measured by the "crib" test (ASTM E 160–50), wherein 24 specimen pieces (½-inch × ½-inch × 3 inches) are subjected to a flame at $315°\pm8°$ C. for 3 minutes, and the percent weight loss and duration of glow are recorded. Still other tests have been devised for other forms of cellulose.

In the above-mentioned vertical flame test, it has been generally observed that the char length will be either less than about half of the sample, or the entire sample will be consumed. As a result, when employing a 10- or 12-inch by 2-½-inch sample, flame-retardant properties are generally considered adequate if the char length is less than an arbitrarily selected value, generally 4-½ to 6-½ inches, depending upon fabric weight. As applied to an 8-ounce, woven cotton twill fabric, a char length of less than 5 inches is taken to signify a satisfactory degree of flame retardance. To achieve this degree of flame retardance with 8-ounce cotton fabrics, the product produced in accordance with this invention should contain phosphorus in an amount of from about 0.2 to about 3 weight percent, based upon the cotton, and nitrogen in an amount equal to at least the value of the expression $3-P$ where P is the weight percent phosphorus. Preferred phosphorus contents range from about 0.2 to about 1.5 weight percent. It should be noted that this expression is valid only for the specific substrate, although similar inverse relations will be observed with other substrates.

When a bis(epoxyalkyl) halomethylphosphonate has been employed in accordance with this invention, the phosphorus content of the substrate can be increased, if desired, by reaction with a trialkyl phosphite or a halogenated derivative thereof as illustrated by the formula:

$$P(OR^{10})_3 \quad (VI)$$

Wherein each $R^{10}$, when taken alone, is lower alkyl or halo lower alkyl.

The phosphite reacts with the pendant halomethyl group of the bis(epoxyalkyl) halomethylphosphonate residue in accordance with Equation B above. Unlike the reaction of the diepoxide monomer, however, this reaction readily proceeds in good yields. When a halogenated trialkyl phosphite is employed, long polyphosphonate chains can be built up by repetition of this phosphite-alkyl halide reaction.

When this treatment is employed, the reaction is desirably effected by immersing the substrate in a solution of the phosphite in a tertiary amide, such as an amide or lactam of the formula:

$$ACONA^1A^2 \quad (VII)$$

Wherein A, when taken alone, is hydrogen or lower alkyl; each of $A^1$ and $A^2$, when taken separately, is lower alkyl; and A and $A^1$, when taken together, are lower alkylene which, when taken with the alkyl carbamoylene radical ($-CONA^2-$), forms a 5-to 7-membered heterocyclic ring.

By the term "lower alkylene" is meant a divalent linear or branched alkylene group of up to about 10, preferably about six, carbons, having from three to five carbons between the valence bonds. Preferred lower alkylene groups are tetramethylene and methyl-substituted tetramethylene groups.

Illustrative solvents include N,N-dimethylformamide, N,N-dimethylacetamide, 1-methyl-2-pyrrolidinone and 1,5-dimethyl-2-pyrrolidinone. Other solvents which may be employed include, for example, dimethyl sulfoxide and tetramethylene sulfone.

In general, the solution should contain from about 10 to about 50 weight percent phosphite, and the reaction should be effected at elevated temperature, for example from about 130° C. to about 180° C.

Although broadly useful for any flammable substrate, the treatment of this invention is particularly well suited for imparting flame-retardant properties to cellulose, whether in a textile or a nontextile form. Textile forms include filaments, fibers, yarns and fabrics (whether woven or nonwoven, such as bonded and knitwear fabrics). The cellulose can be from any source, including such natural sources as seed hairs such as cotton, bast fibers such as flax (linen), ramie, jute or hemp, as well as synthetic sources, for example regenerated cellulose such as rayon, or modified rayon, and partially acylated cellulose such as partially acetylated cellulose. Nontextile forms include both fiber and nonfiber forms, such as wood, paper and cellulosic film, whether in native, regenerated or partially substituted form. The treatment of this invention, although of most benefit for wholly cellulosic materials, is generally useful for cellulosic materials containing at least about 30 weight percent cellulose, such as blended yarns and fabrics.

The following examples are illustrative. In the examples the following test methods were employed:

1. Elemental Analyses
   a. Phosphorus content was determined by combustion according to the Schoniger technique followed by a colorimetric technique employing a molybdenum blue complex, or by Kjeldahl digestion followed by a colorimetric technique employing acetone-water to intensify the phosphomolybdate color. [Bernhart, et al., Anal. Chem., 27, 440 (1955).].
   b. Nitrogen content was determined by Kjeldahl digestion followed by either
      1. The Nessler colorimetric technique, or
      2. Distillation as ammonia followed by titration.
   c. Covalently bound chlorine content was determined by hydrolysis to chloride ion followed by argentimetric titration.
2. Vertical Flame Test
AATCC 34–1952, Char Length Reported in Inches.

EXAMPLE 1

A. Several samples of 100 percent cotton fabric (weighing 8 ounces per square yard, made from twisted yarn in a twill weave) were dried at 80° to 85° C. and weighed on an analytical balance. The samples were padded to a wet pickup of 84 to 85 percent with an aqueous solution which contained 30 weight percent of bis(2,3-epoxypropyl) chloromethylphosphonate and 2.4 weight percent zinc tetrafluoroborate, on a laboratory padder. The resulting samples were dried at 80° to 85° C., then cured for 5 minutes at 150°±2 C. After curing, they were rinsed in dilute potassium bicarbonate, then in a 0.1 percent aqueous solution of a nonionic detergent (t-octylphenol bound to 9-10 repeating units of ethylene oxide), then in dilute hydrochloric acid, and finally in water. After being dried at 80° to 85° C., they were reweighed. Weight gains were 14.6 ±0.2 percent. Analyses showed 1.61 percent chlorine and 1.37 percent phosphorus. In vertical flame resistance tests the samples burned the entire length (BEL).

B. In order to increase the phosphorus content samples produced as described above were repadded from a pad bath having the same composition as the one used initially. The additional wet pickups were 87 to 90 percent. The resulting samples were dried at 80° to 85° C., then cured for 5 minutes at 150°±2 C. After curing, they were rinsed by the same sequence of rinse baths as before. Weight gains were 20.3±0.2 percent. Analyses showed 2.19 percent chlorine and 1.89 percent phosphorus. As before the samples burned the entire length in vertical flame resistance tests.

C. Two sets of samples, one of which was padded once as described in part A above and the other of which was padded twice as described in part B, were immersed for 1 hour in 30 times their weight of a 25 percent solution of triethyl phosphite in N,N-dimethylformamide at 150° C. After removal from the solution, each sample was rinsed in 3 portions of dimethylformamide, then in water, next in a 5 percent aqueous solution of hydrochloric acid, and finally in water. After the samples had been dried at 80° to 85° C., they were analyzed and found to have chlorine contents of 1.05 percent (initially padded but once) and 1.49 percent (the repadded series) and phosphorus contents of 2.12 percent (initially padded but once) and 3.11 percent (the repadded series). Those percentages confirmed that some of the chlorine in both series of samples had been replaced by groups of atoms containing phosphorus, but despite phosphorus contents of 2.12 and 3.11 percent, the char lengths were 6.15 ±0.05 inches in the vertical flame resistance test, or somewhat greater than the desired value of 5.

D. Samples of both series of example 1C were again overpadded, this time with 5 percent aqueous solution of urea. After both series of samples had been dried at 80° to 85° C., they were found to pass the vertical flame resistance test with char lengths of 4.8 and 4.1 inches respectively for the series at phosphorus levels of approximately 2 and 3 percent.

EXAMPLE 2

Two samples of 100 percent cotton fabric (weighing 8 ounces per square yard, made from twisted yarn in a twill weave) were dried in an oven at 93°±1° C. for thirty minutes and weighed on an analytical balance. The samples were padded to 73 percent wet pickup with an aqueous solution which contained 30 weight percent bis(2,3-epoxypropyl) chloromethylphosphonate, 2.4 weight percent zinc tetrafluoroborate, 15 weight percent $N^2$, $N^4$, $N^6$-tris-(hydroxymethyl)melamine(TMM) and 1 percent of a 30 percent aqueous solution of hydrogen peroxide, and then dried at approximately 60° C.

One sample (A) was cured directly on a frame for 5 minutes at 150°±2° C. in a forced-draft oven. The other sample (B) was steamed for 8 minutes to assist in the wet fixation of the TMM on the fibers of the cellulose, then cured as Sample A had been. After curing, both samples were washed in a 0.1 percent aqueous solution of a nonionic detergent (t-octylphenol) bound to 9-10 repeating units of ethylene oxide), rinsed in water, redried at 93°±1° C. for 30 minutes, and reweighed. The weight gain was 19.0 percent for Sample A and 19.3 percent for Sample B. Results of analyses and the vertical flame resistance test were as follows:

| Sample | Fabric Analysis | | Vertical Flame Test. Char Length, Inches. |
|---|---|---|---|
| | % N | P | |
| A | 3.21 | 1.05 | 3.9 |
| B | 2.98 | 0.98 | 3.7 |

EXAMPLE 3

Six samples of 100 percent cotton fabric (weighing 8 ounces per square yard, made from twisted yarn in a twill weave, and dyed khaki) were conditioned at a relative humidity of 65±2 percent (21°±1° C.) and weighed on an analytical balance. They were padded in three series (each consisting of two samples) with three aqueous solutions of $N^2$, $N^4$,$N^6$-tris(hydroxymethyl)melamine (TMM) and hydrogen peroxide. The three pad baths had the following compositions in percent by weight.

| | Bath A | Bath B | Bath C |
|---|---|---|---|
| TMM | 16.5 | 11.5 | 7.25 |
| H₂O₂ (30%) | 1.0 | 1.0 | 1.0 |
| Water | 82.5 | 87.5 | 91.75 |
| | 100.0% | 100.0% | 100.0% |

Weight pickup was 62.8±2.3 percent. The six pretreated samples were dried partially to a moisture content of 30±10 percent, steamed for 8 minutes, rinsed in a 0.1 percent aqueous solution of a nonionic detergent (t-octylphenol bond to 9-10 repeating units of ethylene oxide), rinsed in water, dried, reconditioned, and reweighed. The weight gains (corrected for moisture regain) and nitrogen contents found by analysis were as follows.

| | Series A | Series B | Series C |
|---|---|---|---|
| Corr. Wt. Gain, % | 9.43 | 5.70 | 2.59 |
| N, % (Found) | 4.34 | 3.10 th 2.08 | |

Next, the six samples were dried at approximately 65° C., weighed, and padded from either of two kinds of pad baths: (1) A bath consisting of a 35.0 percent solution of bis(2,3-epoxypropyl) chloromethylphosphonate in water, or (2) A bath consisting of 33.4 percent aqueous solution of bis(2,3-epoxypropyl) chloromethylphosphonate which also contained 2.3 percent zinc tetrafluoroborate. Data concerning the padding are tabulated below. All samples were dried at approximately 65° C., cured at 150°±2° C. for 5 minutes, rinsed in a 0.1 percent aqueous solution of the nonionic detergent mentioned above, and redried at approximately 65° C. Each sample having at least 0.5 percent phosphorus passed the vertical flame resistance test. The greater the percentage of nitrogen in the range tested, the shorter the char length. Good flame retardancy was obtained on the cotton fabric at 3.5± 1.0 percent nitrogen and 0.5 percent phosphorus.

| | Bath Composition Weight % | | | |
|---|---|---|---|---|
| Sample | Phosphonate | Zn(BF₄)₂ | Wet th Weight Pickup, % | Gain, % |
| A-1 | 35.0 | None | 68 | 3.98 |
| -2 | 33.4 | 2.3 | 65 | 8.68 |
| B-1 | 35.0 | None | 68 | 3.52 |
| B-2 | 33.4 | 2.3 | 68 | 11.1 |
| C-1 | 35.0 | None | 69 | 2.97 |
| C-2 | 33.4 | 2.3 | 68 | 11.0 |

| Sample | Fabric Analysis, % Cl | N | P | Char Length, Inches |
| --- | --- | --- | --- | --- |
| A-1 | 0.66 | 4.51 | 0.50 | 3.5 |
| A-2 | 1.20 | 4.22 | 1.03 | 3.4 |
| B-1 | 0.54 | 2.73 | 0.56 | 4.0 |
| B-2 | 1.28 | 2.48 | 1.19 | 4.2 |
| C-1 | 0.46 | 1.84 | 0.44 | BEL |
| C-2 | 1.37 | 2.00 | 1.33 | 5.0 |

EXAMPLE 4

Two samples of the cotton fabric used at the start of example 3 were padded from Bath A of that example. All procedural and quantitative details were identical with those of the TMM-treated samples of Series A of example 3 (e.g., the resulting fabric samples had a nitrogen content of 4.34 percent) up to, but not including, the step of drying before repadding.

Another sample of the cotton fabric used at the start of example 3 was padded from Bath B of that example. Each procedural and quantitative detail was identical with the corresponding detail of the TMM-treated samples of Series B of example 3 (e.g., the resulting fabric sample had a nitrogen content of 3.10 percent) up to, but not including, the step of drying before repadding.

Next, the three samples were dried at approximately 65° C., weighed, and then padded from either of two kinds of pad baths: (1) A bath consisting of a 35.0 percent solution of bis(2,3-epoxypropyl) methylphosphonate in water; and (2) A bath consisting of a 35.0 percent aqueous solution of bis(2,3-epoxypropyl) methylphosphonate which also contained 2.4 percent zinc tetrafluoroborate. Data concerning the processing and testing are tabulated below. Samples were dried at approximately 65° C., cured at 150°±2° C. for 5 minutes and then rinsed and redried as in example 1.

As is evident from the following tabulation, good flame retardancy lasting through at least 10 cycles of laundering resulted at a phosphorus level of approximately 1.5 percent and a nitrogen level of approximately 4 percent, thus demonstrating the hydrolytic resistance of the reaction product obtained in the treatment of cellulose with bis(2,3-epoxypropyl) methylphosphonate.

| Sample | Bath Composition, Weight % Phosphonate | Zn(BF$_4$)$_2$ | Pickup % | Wet Weight Gain, % |
| --- | --- | --- | --- | --- |
| A-1 | 35.0 | None | 66 | 10.6 |
| A-2 | 35.0 | 2.4 | 69 | 9.87 |
| B-1 | 35.0 | None | 67 | 9.61 |

| Sample | Fabric Analysis, % N | P | Vertical Flame Test, Char Length, Inches; Number of Launderings None | 1 | 10 |
| --- | --- | --- | --- | --- | --- |
| A-1 | 4.06 | 1.53 | 3.5 | 3.8 | 4.3 |
| A-2 | 4.14 | 1.28 | 3.2 | 4.3 | 5.3 |
| B-1 | 2.97 | 1.28 | 3.8 | 4.2 | 5.1 |

What is claimed is:

1. A method for imparting flame resistance to a flammable cellulosic substrate which comprises treating the substrate with (a) a bis(epoxyalkyl) methylphosphonate of the formula:

$$(RO)_2P(O)CH_2R^1$$

Wherein R is epoxy lower alkyl; and R$^1$ is hydrogen, chlorine, bromine or iodine, in an amount which, if employed alone, does not provide satisfactory flame resistance, and (b) an organic nitrogen-containing compound having a normal boiling point higher than about 200° C. and nitrogen in the form of an amine or amide linkage in an amount sufficient to render the substrate flame-retardant.

2. A method according to claim 1 wherein said substrate is a cellulosic material in a textile form and the amount of said methylphosphonate is sufficient to provide from about 0.2 to about 3 weight percent phosphorus, based on cellulose 3. A method according to claim 2 wherein R is 2,3-epoxypropyl.

4. A method according to claim 3 wherein R$^1$ is hydrogen.

5. A method according to claim 3 wherein R$^1$ is chlorine.

6. A method according to claim 2 wherein at least the bis(epoxyalkyl) methylphosphonate is insolubilized by heating the product thereof at elevated temperature.

7. A method according to claim 6 wherein R$^1$ is chlorine, bromine or iodine and the product thereof is reacted with a phosphite of the formula:

$$P(OR^{10})_3$$

Wherein each R$^{10}$, when taken separately is lower alkyl, chloro lower alkyl, bromo lower alkyl or iodo lower alkyl.

8. A method according to claim 6 wherein said substrate is a woven cotton fabric, and the percentage of nitrogen is at least the amount defined by the expression 3-P wherein P is the phosphorus percentage of the product.

9. A method according to claim 8 wherein said organic nitrogen-containing compound contains at least one linkage of the partial formula:

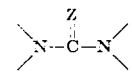

Wherein Z is oxo, thioxo, or substituted or unsubstituted imino.

10. A method according to claim 8 wherein said organic nitrogen-containing compound is represented by the formula:

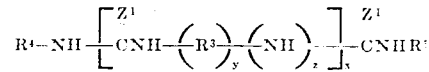

Wherein each Z$^1$, when taken separately, is oxo, thioxo or imino; R$^3$ is alkylene of one to five carbons; each R$^4$ and R$^5$ is hydrogen, cyano, amino, or alkyl or hydroxyalkyl of up to five carbons; and each of x, y and z is an integer having a value of 0 or 1.

11. A method according to claim 8 wherein said organic nitrogen-containing compound is represented by the formula:

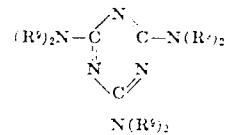

Wherein each R$^9$, independently, is hydrogen, lower alkyl, hydroxy lower alkyl or lower alkoxy lower alkyl.

12. The product of the method of claim 2.
13. The product of the method of claim 4.
14. The product of the method of claim 5.
15. The product of the method of claim 6.
16. The product of the method of claim 7.
17. The product of the method of claim 8.

* * * * *